(12) United States Patent
Colleoni et al.

(10) Patent No.: US 11,522,349 B2
(45) Date of Patent: Dec. 6, 2022

(54) CABLE-LAYING APPARATUS PROVIDED WITH A SAFETY SYSTEM AND METHOD FOR STOPPING SAID CABLELAYING APPARATUS SAFELY

(71) Applicant: TESMEC S.P.A., Milan (IT)

(72) Inventors: Matteo Colleoni, Ponte San Pietro (IT); Fabrizio Parodi, Valbrembo (IT)

(73) Assignee: TESMEC S.P.A., Milan (IT)

( * ) Notice: Subject to any disclaimer, the term of this patent is extended or adjusted under 35 U.S.C. 154(b) by 449 days.

(21) Appl. No.: 15/772,458

(22) PCT Filed: Oct. 27, 2016

(86) PCT No.: PCT/EP2016/075926
§ 371 (c)(1),
(2) Date: Apr. 30, 2018

(87) PCT Pub. No.: WO2017/072230
PCT Pub. Date: May 4, 2017

(65) Prior Publication Data
US 2018/0316165 A1  Nov. 1, 2018

(30) Foreign Application Priority Data

Oct. 30, 2015 (IT) .......................... 102015000067547

(51) Int. Cl.
*H02G 1/04*    (2006.01)
*B65H 59/04*   (2006.01)
*B60M 1/28*    (2006.01)

(52) U.S. Cl.
CPC ................ *H02G 1/04* (2013.01); *B60M 1/28* (2013.01); *B65H 59/04* (2013.01)

(58) Field of Classification Search
CPC . H02G 1/04; B60M 1/28; B65H 59/04; F16L 13/012; F16L 13/01; B16H 7/18; B16H 7/20
See application file for complete search history.

(56) References Cited

U.S. PATENT DOCUMENTS 3,037,720 A * 6/1962 Leithiser, Jr. ............ H02G 1/04
                                                242/364.2
3,121,557 A * 2/1964 James ..................... H02G 1/04
                                                254/134.3 R
(Continued)

FOREIGN PATENT DOCUMENTS

WO    2014087222 A2    6/2014

OTHER PUBLICATIONS

International Search Report from PCT/EP2016/075926 dated Jan. 23, 2017 (3 pages).

*Primary Examiner* — Tyrone V Hall, Jr.
*Assistant Examiner* — Makena S Markman
(74) *Attorney, Agent, or Firm* — Calfee Halter & Griswold LLP

(57) ABSTRACT

Apparatus to lay cables, comprising a work unit bearing at least a pair of capstans to support the cables and provided with a safety device cooperating with the pair of capstans; a winding and unwinding unit for the cables, provided with a dynamic braking device cooperating with a reel for winding and unwinding the cables; an adjustment and safety hydraulic circuit in which a work fluid flows and with which the following are associated: a first power transmission unit to transmit power to the work unit and to pump the work fluid toward the safety device and toward said dynamic braking device, a second motorized braking unit of the work unit cooperating with a third command unit of the safety device, and a fourth regulation unit to regulate the winding and unwinding unit comprising at least a motorized counter- (Continued)

traction valve of the winding and unwinding unit and cooperating with said power transmission unit.

13 Claims, 7 Drawing Sheets

(56) References Cited

U.S. PATENT DOCUMENTS

| | | | | | |
|---|---|---|---|---|---|
| 3,996,999 | A | * | 12/1976 | Termont | B60K 11/00 |
| | | | | | 165/41 |
| 4,053,058 | A | * | 10/1977 | Jensen | B66C 23/703 |
| | | | | | 212/298 |
| 4,234,167 | A | * | 11/1980 | Lane | B66D 1/50 |
| | | | | | 254/291 |
| 4,447,044 | A | * | 5/1984 | Nakata | B66D 1/44 |
| | | | | | 192/17 A |
| 5,007,599 | A | * | 4/1991 | Forsyth | B65H 75/4489 |
| | | | | | 242/390.6 |
| 5,176,364 | A | * | 1/1993 | Bell | B66D 1/08 |
| | | | | | 254/291 |
| 5,984,277 | A | * | 11/1999 | Kanzler | B66D 1/741 |
| | | | | | 254/291 |
| 6,119,837 | A | * | 9/2000 | Tschurbanoff | B65H 75/425 |
| | | | | | 191/12.2 A |
| 7,246,712 | B2 | * | 7/2007 | Baker | B66C 21/04 |
| | | | | | 212/78 |
| 7,896,315 | B2 | * | 3/2011 | Faust | B66D 1/58 |
| | | | | | 254/275 |
| 9,556,919 | B2 | * | 1/2017 | Vitali | H02G 1/04 |
| 10,109,988 | B2 | * | 10/2018 | Oscar | H02G 1/04 |

* cited by examiner

CABLE-LAYING APPARATUS PROVIDED WITH A SAFETY SYSTEM AND METHOD FOR STOPPING SAID CABLELAYING APPARATUS SAFELY

CROSS-REFERENCE TO RELATED APPLICATION

This application is the U.S. national phase entry of PCT/EP2016/075926, with an international filing date of 27 Oct. 2016, which claims the benefit of Italian Application Serial No. 102015000067547, with a filing date of 30 Oct. 2015, the entire disclosures of which are fully incorporated herein by reference.

FIELD OF THE INVENTION

The present invention concerns a cable-laying apparatus and a method for stopping a cable-laying apparatus safely.

In particular, the present invention concerns laying apparatuses or machines, for example for laying a high-voltage aerial electric line, or a railway contact line or other, and in general aerial lines that provide a so-called "braked" laying of the cables.

BACKGROUND OF THE INVENTION

It is known that the traditional system for laying an electric line provides a so-called "braked" laying, using machines with multiple capstans: a winch machine, which recovers a steel cable with a drawing function, and a braking machine, which applies a controlled tension on the wires during the laying step, so as to guarantee they can remain suspended to the guide devices provided on the intermediate supports, so as not to slide on the ground or against obstacles present under the wires, such as road or rail crossings, intersections with other electric lines and so on. Moreover, it is more and more common to use a helicopter to draw the pilot cable from the brake station to the winch station, or sometimes even to draw the final wire, thus eliminating the winch machine in this operation.

The same concepts are applied to aerial laying of guard cables with optical fiber cores (OPGW) or without optical fiber cores (GW).

The technology of braked laying is also applied in laying the electric overhead contact lines for railway traction, with the difference that the braking machine is mounted on a translating wagon, whether self-propelling or drawn, and thanks to the movement of the wagon the brake releases the contact cable or the suspension cable at a controlled tension.

Traditional braked laying machines are known to be equipped with an automatic drive mechanical safety device, for example a negative brake, the purpose of which is to hold the load of the wire or cable laid, both when the machine is stationary, that is, when it is not fed, and also in emergency situations, for example due to a malfunction in the circuit.

Traditional winch machines for braked laying are also normally equipped with two devices to limit and control the overload, which if used correctly can prevent situations of serious overloading along the path of the cables laid.

Using a mean other than traditional winch laying machines to perform the traction and/or translation operations, as in the case of the railway wagon or helicopter, means that a possible sudden stoppage of the braking machine, even if due to extraordinary causes the automatic drive safety device to hold the load. This closure of the automatic drive safety device generates a recoil on the translating mean, not necessarily synchronized with the braking machine or having a long stoppage time with respect to the instantaneous closure of the automatic drive safety device, and a consequent overload on the stretched cable, which can lead to damage and even breakage of the cable, with obvious risks to the safety of the operators and risks of great damage to everything that is under the cable. Therefore, in practice, this recoil neutralizes the safety function for which the automatic drive safety device is supplied. If a helicopter is used, the recoil of the cable could even lead to the instability of the aircraft, with obvious serious consequences.

The same can be said in the event of a sudden stoppage of the winding/unwinding machine connected to the braking machine, on which the cable to be laid is positioned and which must supply the correct tension (called counter-traction) to the wire, which is needed to generate the friction of the wire on the pair of capstans.

If the braking machine stops, a normal traction regulation valve present in known systems, with a hydraulic or electric piloted command, moves to a position of maximum opening, that is, minimum pressure of the regulation field, once the piloting stops, so that traditional systems with an accumulator to keep the automatic drive safety device open lose their effectiveness, because the tension on the cable or wire is no longer controlled.

From the Italian patent n. 0001414902 a safety plant is known for a cable-laying machine which is provided with a motorized drive device connected to the valve to regulate the traction or maximum pressure of the plant, and having the function of keeping the traction set where other devices prevent the automatic closure of the negative brake, hence limiting the recoil and keeping the main valve for regulating the traction under pressure, with the final result of keeping the wire under tension and preventing it from falling to the ground. The plant described in this patent therefore acts on controlling the traction applied to the machine.

However, this plant too has some disadvantages, connected especially to the different modes in which the cable-laying machine can function, for example winch mode, brake mode or assisted braking mode.

Like the other known systems, this plant too is not very efficient and does not fully solve the problems of safety and control in the case of different functioning modes of the machine.

One purpose of the present invention is therefore to obtain a cable-laying apparatus that can be made safe, effectively and automatically, whatever type of work or functioning mode it is performing, hence for example winch mode, brake mode or assisted braking mode, which guarantees the correct behavior as a function of the different types of breakdown or stoppage that can occur, and which therefore allows the operators to conclude or stop, where possible, the laying of the cables or wires in maximum safety.

Another purpose of the present invention is to obtain a method to stop cable-laying apparatuses safely, which allows to obtain conditions of maximum safety quickly, effectively and automatically, also as a function of different functioning modes of the laying apparatus.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a cable-laying apparatus according to the invention comprises a work unit bearing at least a pair of capstans to support the cables and provided with a safety device cooperating with the pair of capstans; a winding and unwinding unit for the cables provided with a dynamic braking device cooperating with a winding and unwinding support for the cables; an adjustment and safety hydraulic circuit in which a work fluid flows and with which the following are associated: a first power transmission unit to transmit power to the work unit and to pump the work fluid toward the safety device and toward the dynamic braking device; a second motorized braking unit of the work unit cooperating with a third command unit of the safety device; and a fourth regulation unit to regulate the winding and unwinding unit comprising at least a motorized counter-traction valve of the winding and unwinding unit and cooperating with the power transmission unit.

Advantageously, thanks to the hydraulic command circuit and to the operating units of which it consists and associated with the work unit and/or with the cable winding and unwinding unit, the present cable-laying apparatus is provided with a safety system that allows it, if there is a breakdown, to be put into conditions of maximum safety, in an effective manner, whatever its functioning mode, that is to say as a winch, a brake or a brake in assisted braking mode and whatever the type of breakdown to which it is subjected, that is, electric or electronic breakdown, a breakdown of the drive means provided in the power transmission unit, for example diesel motors, or a type of hydraulic breakdown.

According to another aspect of the invention, the second motorized braking unit of the work unit comprises at least a motorized braking valve cooperating with a hydraulic motor provided in the first power transmission unit.

According to other characteristics of the invention, the first unit comprises a pumping unit to pump the work fluid toward the hydraulic motor; a distributor valve is positioned between the pumping unit and the hydraulic motor and configured to regulate the flow of the work fluid.

According to another aspect, the second motorized braking unit comprises a manual valve to reduce the braking and therefore the tension on the cables.

According to another characteristic, the third command unit of the safety device comprises an accumulator connected to an adjustment valve to open and close the safety device.

The fourth regulation unit of the rewinding unit preferably comprises a blocking device to block the suction of the winding and unwinding unit.

The present invention also concerns a method to safely stop a cable-laying apparatus, comprising a single control and safety hydraulic circuit configured to work in one functioning mode as a winch, in one functioning mode as a brake and in another functioning mode with assisted braking.

According to one aspect of the invention, the method provides the following steps: identifying the functioning mode of the cable-laying apparatus; identifying the type of breakdown or malfunction, for example an electric or electronic breakdown in the drive means of the unit to pump the work fluid, a hydraulic or other breakdown; selectively driving, by means of a single hydraulic circuit, a safety device provided on the work unit, in order to maintain the load on the cables, and selectively driving a dynamic braking device located on the winding and unwinding unit, so as to maintain a certain tension on the cables for at least a certain period of time.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
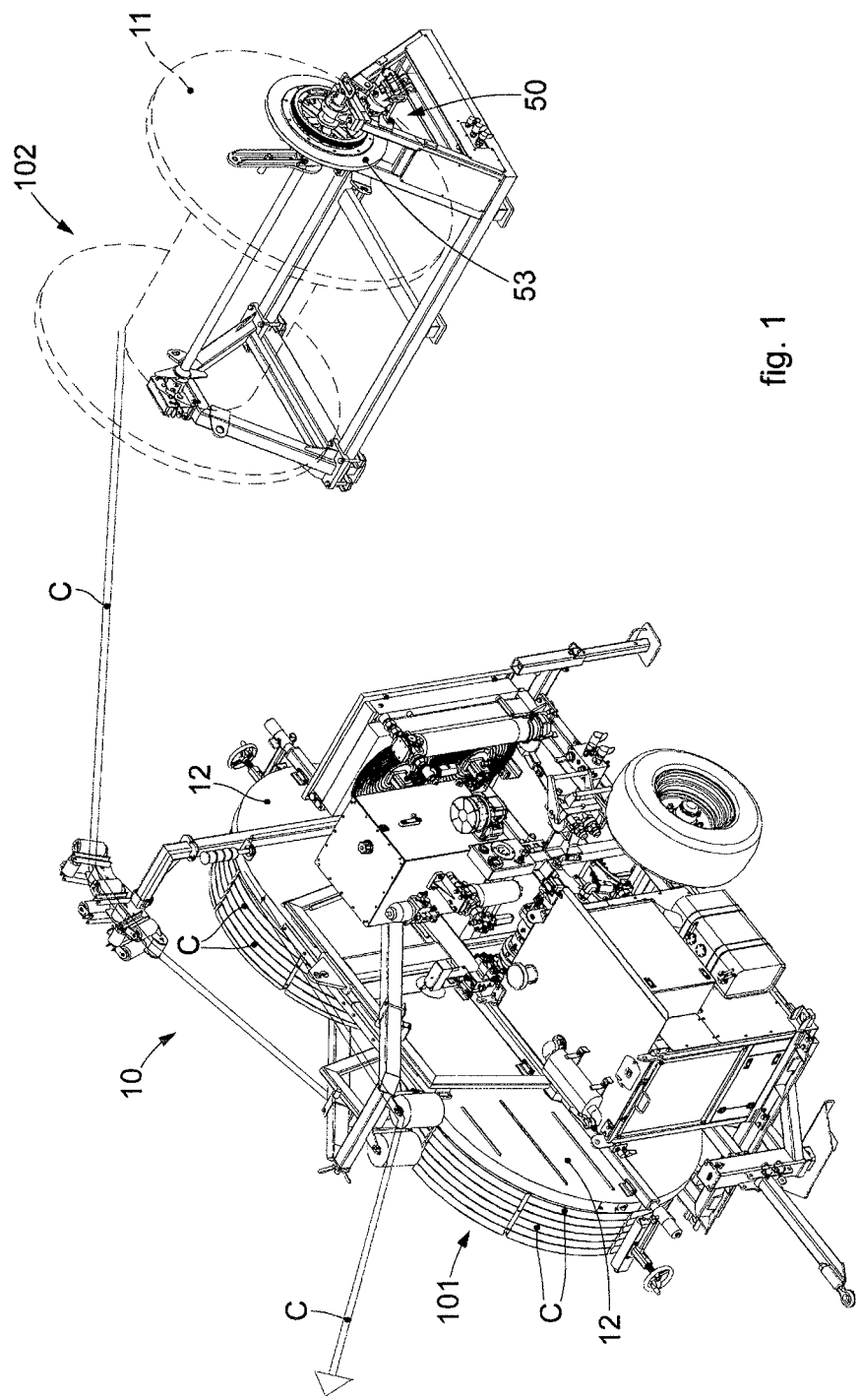
FIG. 1 is a perspective view of a cable-laying apparatus comprising a work unit and a winding unit.

FIG. 1 of the attached drawings shows an apparatus 10 for laying cables, comprising a work unit 101, provided with capstans 12 onto which the cables C to be laid are wound, for example a pair of capstans 12. The cables C are rewound or released in a winding and unwinding unit 102 according to the present invention, comprising a reel 11, around which the cable C is wound/unwound and comprising a dynamic braking device 50, for example a negative brake provided with a corresponding disc 53. The winding and unwinding unit 102 of the reel 11 of cable C to be unwound is normally called winding trestle or reel-carrier trestle. If the laying apparatus 10 works as a brake, for example, the task of the work unit 101 is to guarantee the tension or counter-traction on the cables C between the rewinder and pair of capstans 12: the counter-traction is necessary to guarantee the friction between the grooves of the capstans and the wire that leads to the final tension in the cable C exiting from the capstans.

Figure 2:
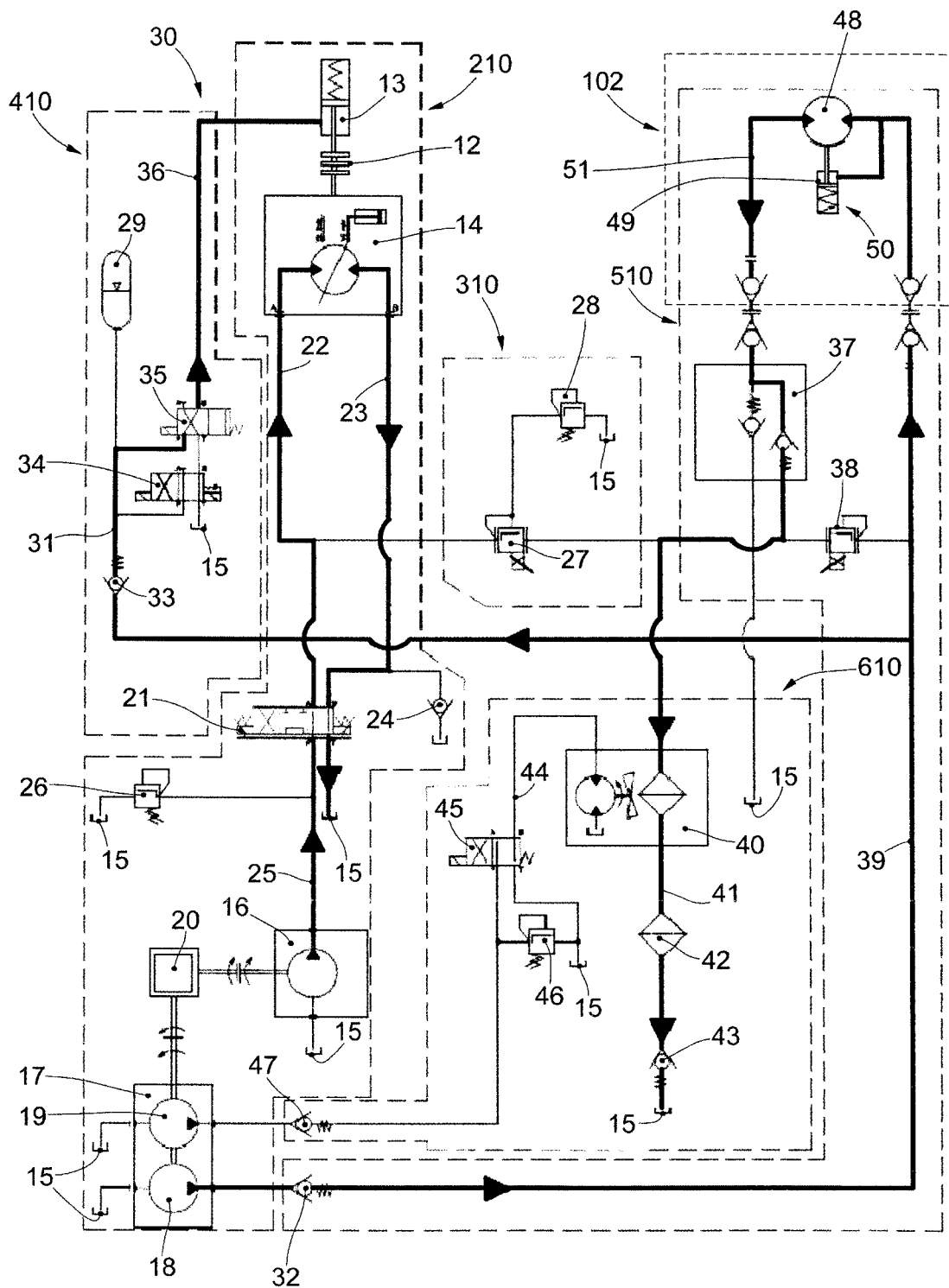
FIG. 2 is a schematic representation of a control and safety hydraulic circuit of the cable-laying apparatus according to the present invention in a first operating condition functioning as a winch.

FIG. 2 shows a single adjustment and safety hydraulic circuit 30 in which a suitable work fluid flows, and to which a series of operating units of the cable-laying apparatus 10 are connected: a first power transmission unit 210; a second motorized braking unit 310; a third command unit 410 of a safety device 13 of the first power transmission unit 210; a fourth unit 510 to regulate the winding and unwinding unit 102; and a fifth conditioning unit 610. In addition to the operating units described above, a command unit is also provided, not shown, on board the work unit 101, shown substantially by the first five operating units from 210 to 610.

The safety device 13 could be a negative brake, a positive brake, a mechanical brake or other.

The safety device 13 is able to operate automatically in case of a breakdown on the hydraulic circuit 30.

The power transmission unit 210 comprises as we said the safety device 13, hydraulically drivable, in case for example of a negative brake, and which allows to block the rotation of the pair of capstans 12. The safety device 13 is located on a reduction unit, not visible in the drawings, which transmits motion to the capstans 12. The power transmission unit 210 of the cable-laying apparatus 10 comprises a hydraulic motor 14, preferably with variable engine size, which when the apparatus is functioning as a brake, can be made to rotate by the pair of capstans 12, thus operating as a hydraulic pump to keep the cables under tension during normal laying operations. The hydraulic motor 14 picks up and discharges the work fluid from a suitable containing tank 15, common to the other operating units from 210 to 610. The power transmission unit 210 comprises a main pump 16 and an auxiliary unit 17 provided with two pumps 18 and 19. The main pump 16 and the pumps 18 and 19 of the auxiliary unit 17 are driven by a motor 20, for example a diesel motor. The main pump 16 is connected to the hydraulic motor 14 by means of a first branch 22 of the hydraulic circuit 30 in which a distributor valve 21 is positioned, in particular, for example, a proportional valve regulated by a corresponding electric motor, not shown. A second branch 23 of the hydraulic circuit 30 connects the hydraulic motor 14 to the tank 15 that contains the work fluid, through the proportional valve 21, while in an offshoot of the branch 23 of the hydraulic circuit a non-return valve 24 is provided. The branch 25 of the hydraulic circuit 30 connected to the main pump 16 is divided into a connection segment with the proportional valve 21 and into a connection segment with the safety valve 26.

In the second motorized braking unit 310, also connected with the hydraulic circuit 30, a motorized braking valve 27 is positioned, and also a braking reduction valve 28, in particular a manual valve, which substantially reduces the intensity of the tension on the cable/cables C, discharging the work fluid into the tank 15.

The third command unit 410 of the safety device 13 comprises an accumulator 29 of the work liquid connected by a branch 31 of the hydraulic circuit 30 to one of the two auxiliary pumps, for example pump 18. Downstream of the pump 18 a first non-return valve 32 is provided, while upstream of the accumulator 29 another non-return valve 33 is provided. The third unit 410 comprises a first distributor valve 34 of the safety device 13 and a second distributor valve 35 of the winch. The valves 34 and 35 are preferably electro valves with a mechanical stop, that is to say, when the command that determines the switching of the valve to a certain position has stopped, the valve remains in the position where it is. The valves 34 and 35 are connected to the branch 31 of the adjustment and safety hydraulic circuit 30 and to a branch 36 of the hydraulic circuit 30 which is connected to the power transmission unit 210, and in particular to the safety device 13 and the laying apparatus 10.

The unit 510 to regulate the winding and unwinding unit 102 comprises a device 37 to block the suction of the winding and unwinding unit 102 and a motorized counter-traction valve 38 of the cables C. The unit 510 also provides a branch 39 of the hydraulic circuit 30 to connect with one of the auxiliary pumps, for example pump 18.

The conditioning unit 610 comprises a radiator 40 connected, by means of a branch 41 of the hydraulic circuit 30, on one side to the tank 15 of work fluid through a filter 42 and a non-return valve 43, and on the other side to the branch of the hydraulic circuit 30 where the motorized braking valve 27 and the counter-traction valve 38 are positioned. The radiator 40 is also connected, by means of another branch 44 of the hydraulic circuit 30, to one of the two auxiliary pumps, for example auxiliary pump 19. The branch 44 of the hydraulic circuit 30 comprises a valve 45 to distribute the work fluid to the radiator 40 and a safety valve 46. The distributor valve 45 is preferably an electro valve. Downstream of the auxiliary pump 19 another non-return valve 47 is provided.

The winding and unwinding unit 102 is shown schematized in the hydraulic circuit 30 by means of two main components: the hydraulic motor 48 and the negative brake caliper 49 of the dynamic braking device 50. The hydraulic motor 48 is connected on one side to the branch 39 of the hydraulic circuit 30 connecting to the auxiliary pump 18, and on the other side to another branch 51 of the hydraulic circuit 30 connecting to the tank 15. In this branch 51 of the hydraulic circuit 30 the device 37 to block the suction is positioned.

The adjustment and safety hydraulic circuit 30 and the various operating units will be managed by a control unit, not shown in the drawings for reasons of clarity, which will be connected electrically to the various elements of the hydraulic circuit 30, such as for example the various electro valves, the diesel motor, the hydraulic motor, the pumps, brakes, pressure detectors and flow rate detectors that the circuit is provided with, and others. The control unit will be managed by a control panel located remote from the laying apparatus 10, which will comprise, as we said, a command unit on board the machine. By means of the control unit and the remote panel, it will therefore be possible to set all the operating parameters of the apparatus 10, for example the working pressures of the work fluid, the maximum working pressure and other.

The cable-laying apparatus 10 can function in at least three different modes: one functioning mode as a winch, one as a brake and one as a brake with assisted braking.

The breakdowns or malfunctions from which the laying apparatus 10 can suffer are fundamentally of three types: a first type of electric and/or electronic breakdown, for example stoppage of the electric signal to the proportional valve 21, breakdown of the electronic board of the control unit, loss of signal from the remote command panel; a second type of breakdown such as the switching off and/or breakdown of the diesel motor 20; and a third type of hydraulic breakdown, which can concern for example a loss of the work fluid in the hydraulic circuit 30, a breakdown of the valves of the apparatus that generally cause any loss of pressure therein.

We will now look at two non-restrictive examples of how the hydraulic circuit 30 works, in the different functioning modes of the laying apparatus 10 and in the event of possible electric, electronic breakdowns, or breakdowns to the motor or hydraulic breakdowns. In general, in the attached drawings, the segments of the hydraulic circuit shown with lines of greater thickness and provided with arrows are the branches of the hydraulic circuit 30 where the work fluid is present.

In a first case, where the laying apparatus 10 is functioning as a winch, see FIG. 2 again, the second distributor valve 35 is switched so as to send the work fluid to the safety device 13, so as to keep it in the open position and hence allow the capstans 12 to rotate. The proportional valve 21 is switched so as to supply a determinate quantity of work fluid to the hydraulic motor 14 by means of the branch 22 of the hydraulic circuit. The work fluid is sent to the proportional valve 21 and then to the hydraulic motor 14 by means of the main pump 16. The branch 23 of the hydraulic circuit 30 in this case represents the return path to the tank 15 of the work fluid. Therefore, in this mode, the capstans 12 are driven and the step of recovering the cables or wires begins. The pressure of the motorized braking unit 210 is set to maximum value by the control unit mentioned above, and the command unit with which the laying apparatus is provided. The dynamic braking device 50 of the winding and unwinding unit 102 is de-activated, in this functioning mode as winch of the machine, by opening the negative brake caliper 49. The winding and unwinding unit 102 is supplied with work fluid through the branch 39 of the circuit and the auxiliary pump 18. The counter-traction motorized valve 38 generates the pressure needed to keep open the negative brake caliper 49 of the dynamic braking device 50. A part of the work fluid branches off toward the radiator 40, the filter 42 and from here returns to the tank 15.

Figure 3:
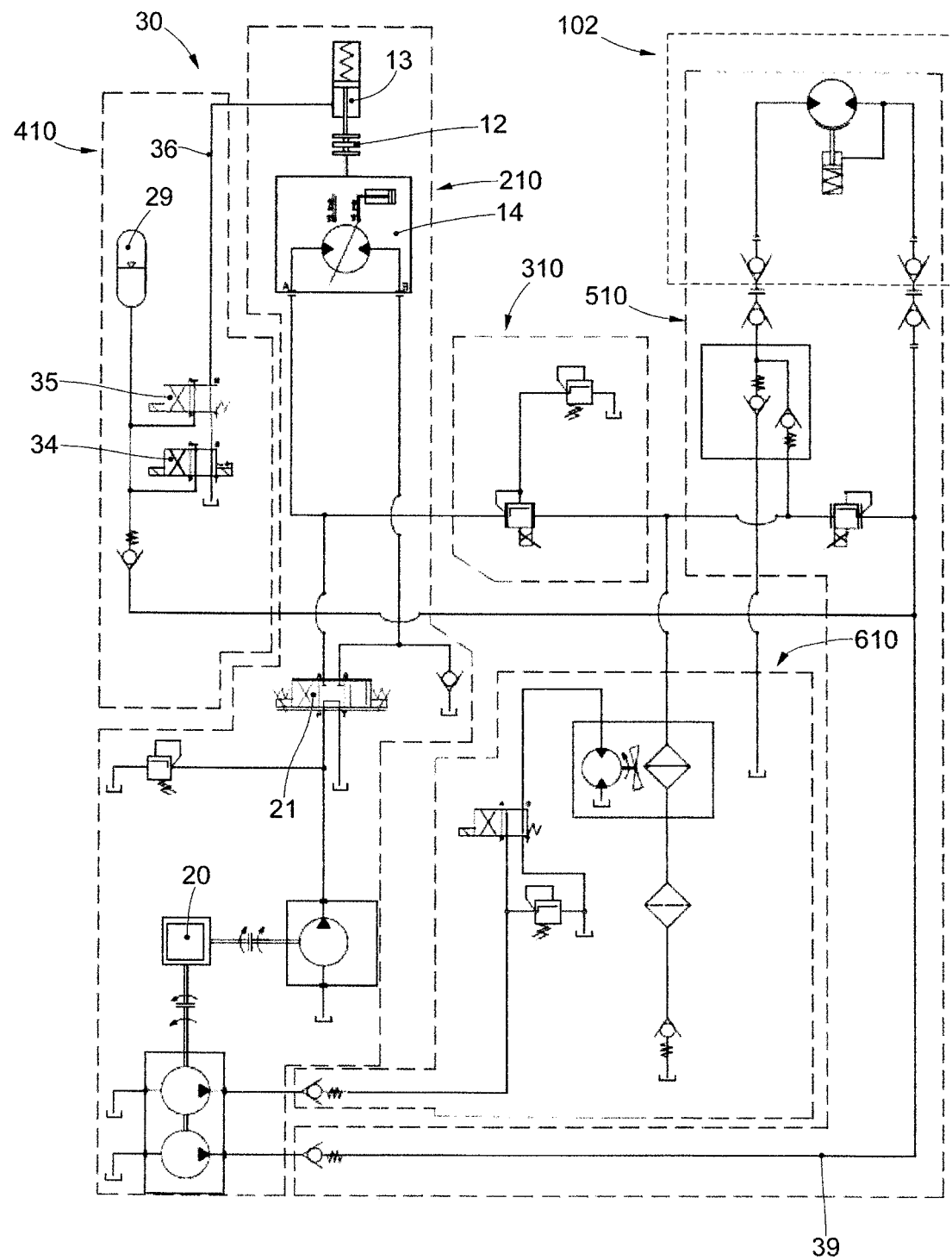
FIG. 3 is a schematic representation of the hydraulic circuit in a second operating condition when the cable-laying apparatus is functioning as a winch and with possible electric breakdowns, breakdowns to the endothermal motor and to the hydraulic circuit.

FIG. 3 shows the behavior of the laying apparatus 10 and the hydraulic circuit 30 in the event of an electric breakdown, a breakdown to the diesel motor 20 or any breakdown in the hydraulic circuit 30 when the laying apparatus 10 is functioning as a winch. The valve 35 of the command unit 410 of the safety device 13 automatically switches to close, interrupting the flow of the work fluid to the power transmission unit 210, so that the rotation of the capstans 12 is immediately interrupted. The proportional valve 21 also automatically switches to a closed position and hence interrupts the flow of work fluid to the hydraulic motor 14. In these cases therefore, the laying operations are interrupted and the machine is stopped in safe conditions with the load maintained. The flow of work fluid in the circuit branch 39 that sends the fluid to the dynamic braking device 50 of the winding and unwinding unit 102 is also interrupted, so that the dynamic braking device 50 of the winding and unwinding unit 102 could close. If the diesel motor 20 stops functioning but there is still work fluid in the hydraulic circuit 30, and in particular in branches 39 and 51, the negative brake caliper 49 of the dynamic braking device 50 remains open.

Again in the case where the laying apparatus 10 functions as a winch, if there is a breakdown in the remote control panel of the apparatus, and hence a loss of the command signal, it is in any case possible to continue the laying operations with the command unit provided in the work unit 101. Substantially, the apparatus 10 continues working with the last settings memorized, and therefore it is possible to use the command unit on board the machine to modify the functioning parameters of the apparatus, without needing to interrupt the laying operations.

Figure 4:
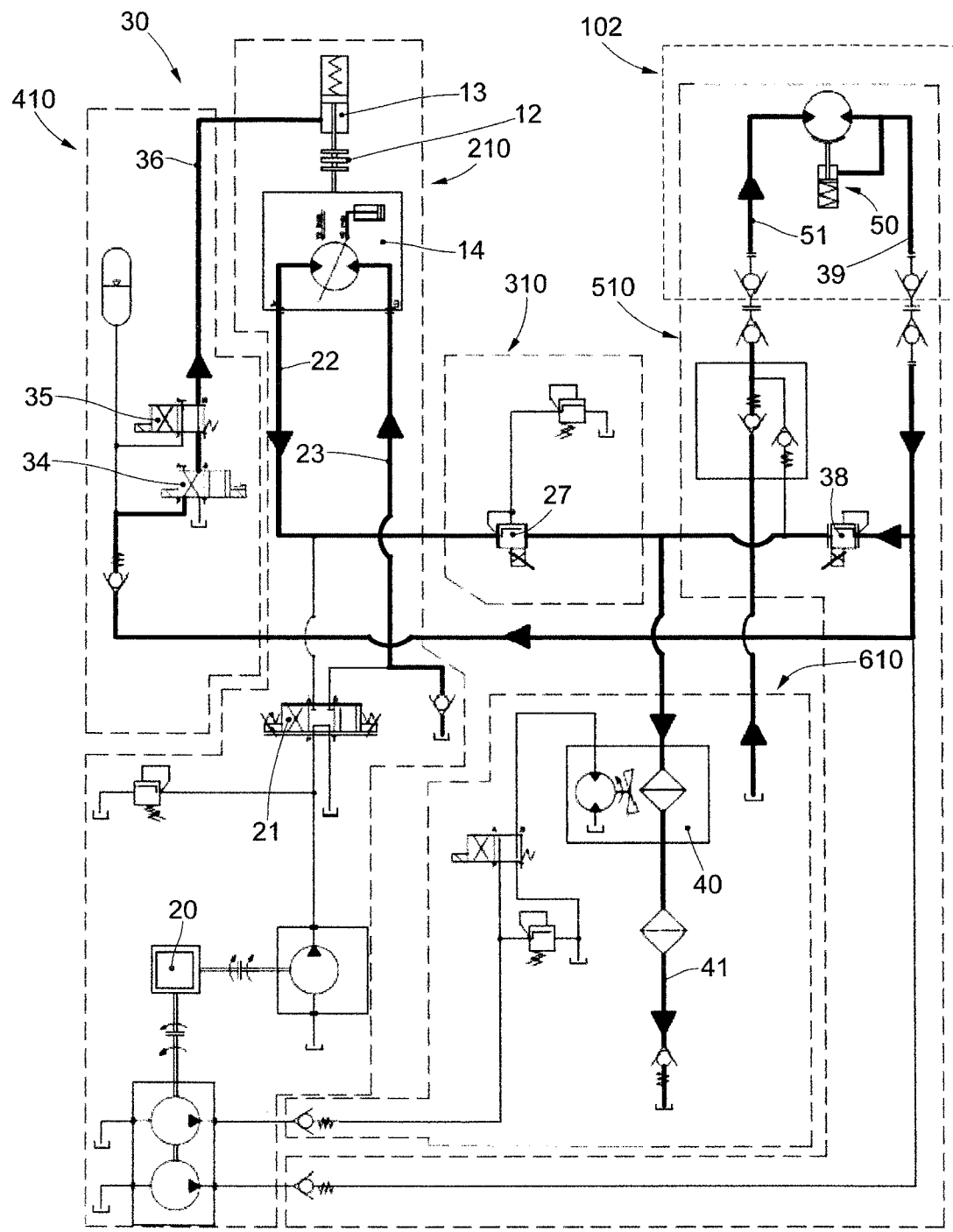
FIG. 4 is a schematic representation of the hydraulic circuit in a third operating condition relating to the functioning of the laying apparatus as a brake.

In the second mode, where the laying apparatus 10 is functioning as a brake, see FIG. 4, the flow of work fluid in the power transmission unit 210 is contrary to that shown in the mode where it is functioning as a winch, and also the flow of work fluid in the winding and unwinding unit 102. In this case, the hydraulic motor 14 works as a hydraulic pump, the distributor valve 34 of the safety device 13 is switched to open so as to open the safety device 13 located on the reduction unit that transfers motion to the capstans 12. The braking intensity of the apparatus 10 is set by regulating the motorized braking valve 27 of the motorized braking unit 310. The dynamic braking device 50 of the winding and unwinding unit 102 in this case is open, so the reel 11 in FIG. 1 can rotate freely to rewind the cable C. The dynamic braking device 50 is allowed to open by the passage of work fluid in the branches 51 and 39 of the hydraulic circuit 30 and by the pressure generated by the motorized regulation valve 38. In this mode the proportional valve 21 is switched to a closed position to prevent sending of the work fluid to the hydraulic motor 14. In practice, by means of the command signal arriving from the work unit 101, the motorized regulation valve 38 is commanded so as to increase the pressure in the branch 39 of the hydraulic circuit 30 to a minimum opening value of the negative brake caliper 49. The negative brake caliper 49 open, allowing the hydraulic motor 48 to generate the necessary counter-traction force set in the design stage for the correct performance of the operations for laying the cable C. If it is desired to increase the value of the counter-traction force, it is necessary to act on the motorized regulation valve 38, or counter-traction valve.

Figure 5:
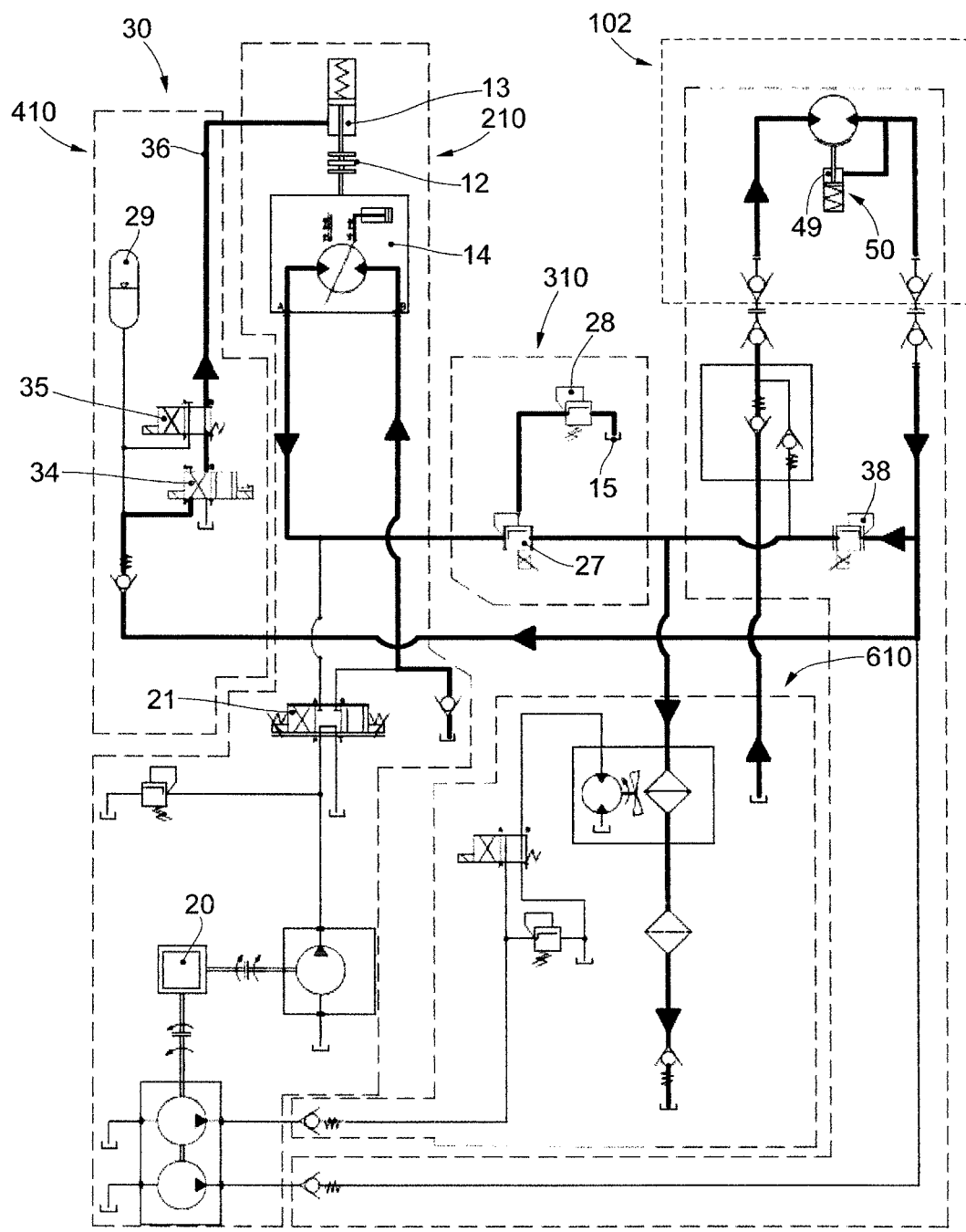
FIG. 5 is a schematic representation of the hydraulic circuit in a fourth operating condition relating to the functioning of the apparatus as a brake when there are breakdowns of the electric circuit or the endothermal motor.

FIG. 5 shows the behavior of the laying apparatus 10 and the hydraulic circuit 30 in the case where the laying apparatus 10 is functioning as a brake and in the event of an electric breakdown, a breakdown in the remote control panel, and hence a loss of the command signal, or a breakdown to the diesel motor 20. The valve 34, as we said, is equipped with a mechanical stop and therefore remains switched as in the position in FIG. 4 where the laying apparatus 10 is functioning normally as a brake. Because the distributor valve 34 is kept open, the safety device 13, for example a negative brake, remains open, preventing the capstans 12 from blocking. In the event of such breakdowns too, the braking intensity previously set in the regular functioning as in FIG. 4 remains set thanks to the motorized braking valve 27. In practice, the electric motor with which the motorized valve 27 is provided keeps the valve open. To lower the traction intensity and continue the laying operations in maximum safety, it is possible to act on the manual braking reduction valve 28, so that at least part of the work fluid is discharged into the tank 15. In this case too, the negative brake caliper 49 of the dynamic braking device 50 of the winding and unwinding unit 102 remains open, thanks to the pressure generated by the counter-traction valve 38, which keeps the value set in normal functioning, as it too is motorized.

Therefore, when the laying apparatus 10 is functioning as a brake and in the event of a loss of command signal, the apparatus continues working thanks to the motorized valves 27 and 38. The command unit on board the machine can in any case be used to modify the functioning parameters of the laying apparatus. Substantially therefore, in the event of such a breakdown, the laying operations can continue and it is possible to stop the machine later at predetermined times and with predetermined modes, so as to repair the breakdown or malfunction.

When there is a breakdown for example to the electric motor that regulates the proportional valve 21, it is possible to reduce the intensity of the traction of the machine by acting on the manual valve 28, and thus to conclude the laying operations in safety. The regulation starts from the last value set in the proportional valve 21 and can go down manually as far as zero.

In the event of a breakdown to the motor 20 too, as we have seen, the laying apparatus 10 continues working, and the capstans 12, drawn by the load of the opposite winch machine, or by a helicopter or by railway traction, generate a re-suction of the work fluid directly from the tank 15. Indeed, as we have seen, the hydraulic motor 14 can function as a hydraulic pump. This allows the time needed to signal the problem to the winch machine, or equivalent, and by reducing the laying speed it is possible to complete the section to be laid. Since the machine does not stop, the safety device 13 and the dynamic braking device 50 remain open, thanks to the pressure maintained inside the command hydraulic circuit 30.

Figure 6:
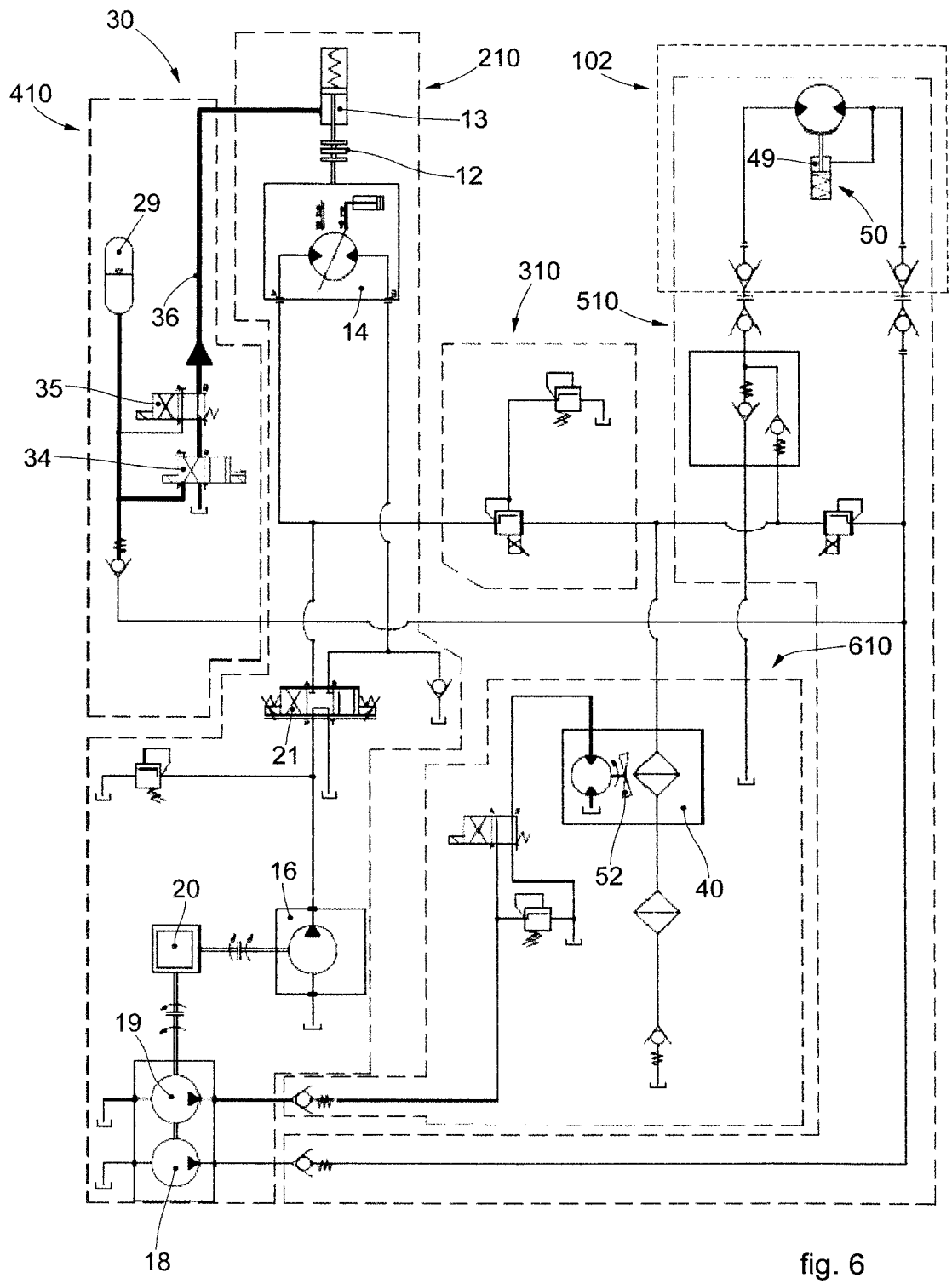
FIG. 6 is a schematic representation of the hydraulic circuit in a fifth operating condition relating to the functioning of the apparatus as a brake when there are breakdowns in the hydraulic circuit.

When the laying apparatus 10 is functioning as a brake and there is a breakdown to the hydraulic circuit and hence a loss of pressure, the hydraulic circuit 30 behaves as in FIG. 6. As in the previous case, the distributor valve 34 that opens the safety device, for example a negative brake, remains switched as in the normal functioning as brake, therefore the safety device 13 remains open, preventing the immediate blockage of the capstans 12 thanks to the intervention of the accumulator 29, which sends work fluid to the branch 36 of the hydraulic circuit 30. The hydraulic motor 14 remains without work fluid and therefore idles, and the fan 52 of the radiator 40 stops functioning. Due to the hydraulic malfunction, as there is no longer any work fluid inside the hydraulic circuit 30, the negative brake caliper 49 of the dynamic braking device 50 closes on the disc 53, generating a fixed resistance which causes a constant traction on the cable C. The traction resistance value is defined during the design step. The control unit in this case switches off the diesel motor 20 so as to safeguard the pumps 16, 18 and 19. In this case too, a pressure value of the work fluid can be set, below which the control unit switches off the diesel motor 20: the pressure value can be 4 bar, for example. The constant counter-traction value generated by the negative brake caliper 49 of the dynamic braking device 50 on the disc 53 allows the winding and unwinding unit 102 to not stop instantaneously. Indeed, an instantaneous stoppage would entail serious risks for the safety of the operators, as well as risks of damage to the cables and the apparatus. The laying apparatus 10 can therefore continue its laying operations for a predefined time, before it is stopped in safe conditions. The dynamic braking time can be two minutes, for example.

Figure 7:
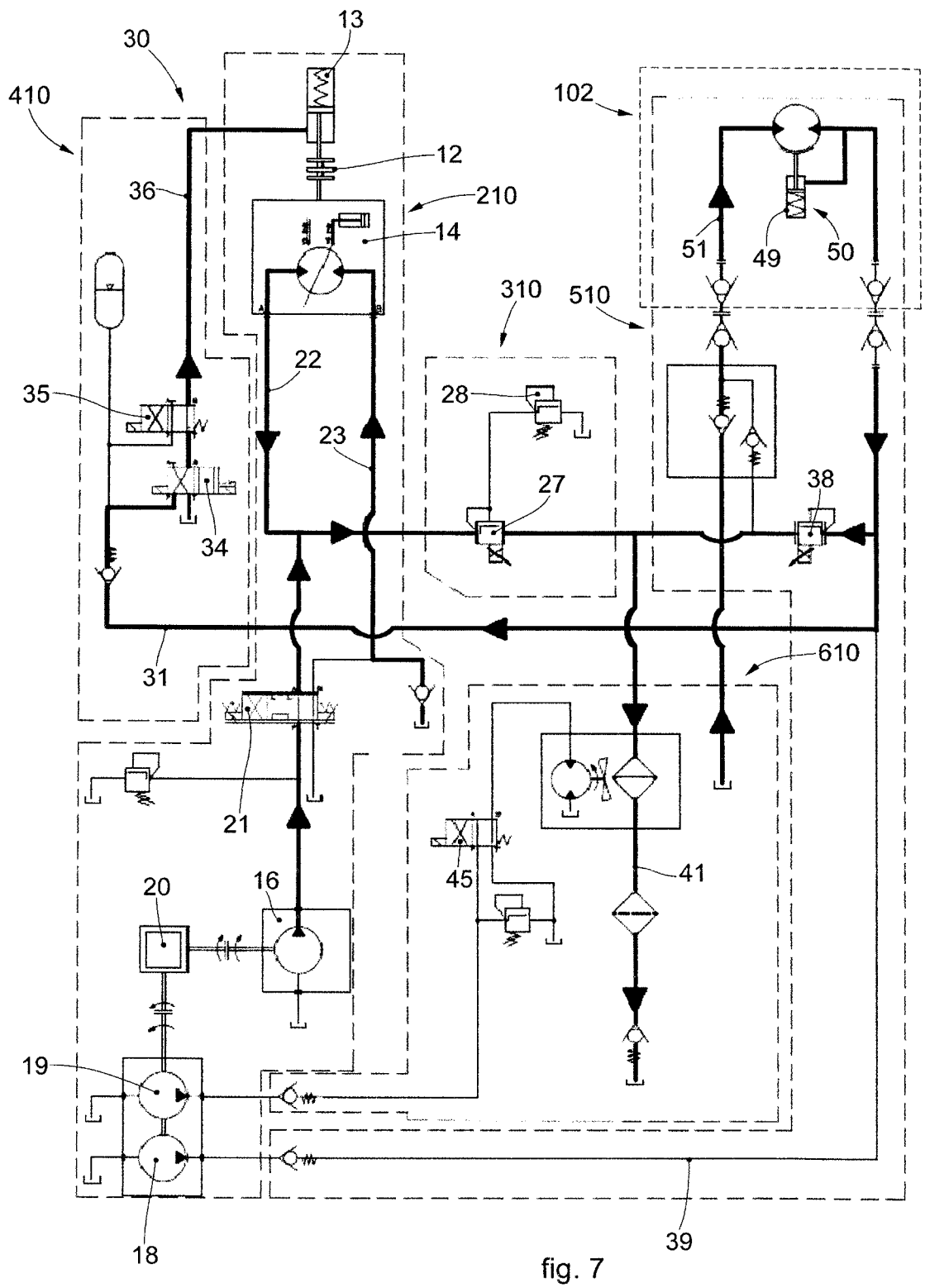
FIG. 7 is a schematic representation of the hydraulic circuit in a sixth operating condition when the apparatus is functioning as a break with assisted braking.

FIG. 7 shows another example of the behavior of the laying apparatus 10 when functioning as a brake and in assisted braking mode. Assisted braking mode is activated on the work unit 101 of the laying apparatus 10 with the apparatus 10 in brake mode and during a recovery of the cable C. The distributor valve 34 of the safety device 13 is switched to open the safety device 13 located on the reduction unit which transmits motion to the capstans 12. In order to guarantee a constant tension or traction on the cable C and compensate the inertia effect of the capstans 12, the proportional valve 21 is switched with a recovery function, as in the case when the apparatus is functioning as a winch, the path of the fluid in the two branches 22 and 23 of the hydraulic circuit is opposite for example to the case where it functions as a winch as in FIG. 2. The value of the braking traction is regulated by the motorized valve 27 of the motorized braking unit 310, while the negative brake caliper 49 of the dynamic braking device 50 of the winding and unwinding unit 102 opens thanks to the pressure generated by the motorized counter-traction valve 38. In the event of any breakdown to the apparatus 10, whether electric, electronic, hydraulic or to the motor, the assisted braking mode is automatically de-activated and the apparatus 10 passes to the brake functioning mode as described with reference to FIGS. 5 and 6.

Based on the above description, the method to secure cable-laying apparatuses can therefore be summarized thus: the functioning mode of the cable-laying apparatus is identified; the type of breakdown or malfunction is identified, for example electric, electronic, to the diesel motor 20 that drives the pumping unit of the work fluid, substantially represented by the group of pumps 16, 18 and 19, a hydraulic breakdown or other; the first safety device 13 provided on the work unit 101 is selectively driven, by means of a single hydraulic circuit 30, so as to keep the load on the cables C; and the dynamic braking device 50, that is a further safety device, located on the winding and unwinding unit 102 is selectively driven, so as to keep at least a certain tension on the cables C for at least a certain period of time.

It is clear that modifications and/or additions of parts may be made to the cable-laying apparatus provided with a safety system and the method to make it safe as described heretofore, without departing from the field and scope of the present invention.

It is also clear that, although the present invention has been described with reference to some specific examples, a person of skill in the art shall certainly be able to achieve many other equivalent forms of cable-laying apparatus provided with a safety system and the method to make the cable-laying apparatus safe, having the characteristics as set forth in the claims and hence all coming within the field of protection defined thereby.

What is claimed is:

1. An apparatus to lay cables and configured to work in a functioning mode as a winch, a functioning mode as a brake, and a functioning mode with assisted braking, comprising:
    a work unit, bearing at least a pair of capstans to support the cables and provided with a safety device cooperating with the pair of capstans;
    a winding and unwinding unit for the cables, comprising a winding motor and provided with a dynamic brake cooperating with a reel for winding and unwinding the cables;
    an adjustment and safety hydraulic circuit in which a work fluid flows;
    a first power transmission unit comprising a hydraulic motor and a pump, transmitting power to the work unit and pumping the work fluid toward the safety device and toward the dynamic brake; and
    a second motorized braking unit of the work unit, cooperating with a third command unit of the safety device, wherein the third command unit of the safety device comprises a hydraulic accumulator connected to an adjustment valve to open and close the safety device; and
    a fourth regulation unit, regulating the winding and unwinding unit, comprising at least a counter-traction valve of the winding and unwinding unit and cooperating with the power transmission unit,
    wherein the counter-traction valve is actuated by a motor,
    wherein the fourth regulation unit of the winding and rewinding unit comprises a blocking device, the blocking device comprising a first non-return valve and a second non-return valve,
    wherein, in the functioning mode as a brake, when the work fluid flows through the blocking device in a first direction, the first non-return valve closes to allow the work fluid to be picked up from a tank and flow through the second non-return valve and then the winding and unwinding unit,
    wherein, in the functioning mode as a winch, when the work fluid flows through the blocking device in a second direction, the second non-return valve closes to block a suction of the winding and unwinding unit, and the first non-return valve opens to allow at least part of the work fluid to branch off to a radiator and then return to the tank.

2. The apparatus as in claim 1, wherein the second motorized braking unit of the work unit comprises at least a motorized braking valve cooperating with the hydraulic motor provided in the first power transmission unit.

3. The apparatus as in claim 2, wherein a first unit comprises:
   a pumping unit, the pumping unit comprising at least one pump for pumping the work fluid toward the hydraulic motor, and
   a distributor valve, positioned between the pumping unit and the hydraulic motor and configured to regulate the flow of the work fluid.

4. The apparatus as in claim 1, wherein the second motorized braking unit comprises a manual valve, reducing the braking and therefore the tension on the cables.

5. The apparatus as in claim 1, wherein the cables are wound or unwound around the reel, and the dynamic brake is operable to contact the reel for applying brake to the reel.

6. The apparatus as in claim 1 further comprising a conditioning unit associated with the adjustment and safety hydraulic circuit and comprising at least the radiator.

7. A method to safely stop a cable-laying apparatus as in claim 1, wherein the apparatus comprises a single control and safety hydraulic circuit configured to work in the functioning mode as a winch, in the functioning mode as a brake and in the functioning mode with assisted braking, wherein the method comprises:
   identifying the functioning mode of the cable-laying apparatus;
   identifying the type of breakdown or malfunction;
   selectively driving, by the single control and safety hydraulic circuit, the safety device provided on the work unit, in order to maintain the load on the cables, and
   selectively driving the dynamic brake located on the winding and unwinding unit, so as to maintain a certain tension on the cables for at least a certain period of time.

8. The method as in claim 7, wherein when the laying apparatus is functioning as a brake and there is an electric or electronic breakdown, the method further comprises:
   keeping the safety device open by a distributor valve of the first power transmission unit switched to open so as to prevent the blocking of the work unit;
   keeping a braking tension by driving a motorized valve of the motorized braking unit; and
   keeping open the dynamic brake of the winding and unwinding unit by driving the motorized counter-traction valve of the fourth regulation unit of the winding and unwinding unit.

9. The method as in claim 8 further comprising:
   lowering the braking tension of the work unit by driving a manual valve to reduce the braking of the motorized braking unit.

10. The method as in claim 7, wherein when the laying apparatus is functioning as a brake and there is hydraulic breakdown, the method further comprises:
    keeping the safety device open by switching a distributor valve to open and by an intervention of the hydraulic accumulator that provides work fluid, and
    controlled stoppage of the winding and unwinding unit by a pre-set closing of the dynamic brake and configured to keep a constant tension on the cable for a determinate period of time.

11. The method as in claim 7, wherein when the laying apparatus is functioning in assisted braking mode and there is a breakdown, the assisted braking mode is automatically de-activated and the functioning method of the laying apparatus passes to braking mode.

12. The method as in claim 7, wherein when the cable laying apparatus is functioning as a winch and there is a breakdown, the method further comprises switching to closed the adjustment valve of the third command unit of the safety device, in order to close the safety device of the work unit, so as to prevent the uncontrolled rotation of the capstan of the work unit and the loss of the load.

13. The method as in claim 7, wherein when the cable laying apparatus is functioning as a winch, as a brake or in assisted braking mode and there is a loss of the command signal from a remote control panel of the operations of the apparatus, the apparatus continues to operate.

* * * * *